United States Patent
Boehringer et al.

(10) Patent No.: US 8,606,455 B2
(45) Date of Patent: Dec. 10, 2013

(54) METHOD AND DEVICE FOR AUTOMATICALLY OPERATING A VEHICLE IN AN AUTONOMOUS DRIVING MODE REQUIRING NO USER ACTION

(75) Inventors: Michael Boehringer, Esslingen (DE); Stefanie Dubiella-Zimmermann, Ehningen (DE); Stefan Jansen, Pforzheim (DE); Julie Lockhart, Mountain View, CA (US); Erik Sengewald, Jena (DE); Fabian Stiebert, Dagersheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/501,019

(22) PCT Filed: Oct. 5, 2010

(86) PCT No.: PCT/EP2010/006079
§ 371 (c)(1),
(2), (4) Date: May 18, 2012

(87) PCT Pub. No.: WO2011/042160
PCT Pub. Date: Apr. 14, 2011

(65) Prior Publication Data
US 2012/0277947 A1      Nov. 1, 2012

(30) Foreign Application Priority Data

Oct. 10, 2009 (DE) .......................... 10 2009 048 954

(51) Int. Cl.
*G01C 21/00* (2006.01)
(52) U.S. Cl.
USPC .......................................... 701/23; 701/301

(58) Field of Classification Search
USPC .............................................. 701/23, 200, 301
See application file for complete search history.

(56) References Cited

U.S. PATENT DOCUMENTS 5,646,843 A * 7/1997 Gudat et al. ...................... 701/3
5,949,345 A * 9/1999 Beckert et al. ............ 340/815.41

(Continued)

FOREIGN PATENT DOCUMENTS

DE      101 44 797 A1    3/2003
DE      102 42 293 A1    4/2004

(Continued)

OTHER PUBLICATIONS

Corresponding International Search Report with English Translation dated Mar. 8, 2012 (four (4) pages).

(Continued)

*Primary Examiner* — Mary Cheung
*Assistant Examiner* — Michael Berns
(74) *Attorney, Agent, or Firm* — Crowell & Moring LLP

(57) ABSTRACT

A method for the automatic operation of a vehicle in an autonomous driving mode not requiring user action is provided. This involves detection of a present traffic situation, a check whether the traffic situation fulfills a first criterion, and a blocking of a functionality which offers to a driver during the autonomous driving mode a secondary activity not related to driving the vehicle if the first criterion is fulfilled. A device for the automatic operation of a vehicle in an autonomous driving mode not requiring user action includes devices designed for carrying out the method for the automatic operation of a vehicle in an autonomous driving mode not requiring user action.

13 Claims, 5 Drawing Sheets

(56) References Cited

U.S. PATENT DOCUMENTS

| | | | |
|---|---|---|---|
| 6,151,539 A * | 11/2000 | Bergholz et al. | 701/25 |
| 6,898,513 B2 * | 5/2005 | Blumbergs et al. | 701/538 |
| 8,248,219 B2 * | 8/2012 | Sato et al. | 340/425.5 |
| 8,317,329 B2 * | 11/2012 | Seder et al. | 353/13 |
| 2007/0198145 A1 | 8/2007 | Norris et al. | |
| 2008/0270015 A1 * | 10/2008 | Ishikawa et al. | 701/119 |
| 2009/0287367 A1 * | 11/2009 | Salinger | 701/23 |

FOREIGN PATENT DOCUMENTS

| | | |
|---|---|---|
| DE | 10 2004 037 231 A1 | 2/2006 |
| DE | 11 2006 002 892 T5 | 11/2008 |
| DE | 10 2009 010 006 A1 | 10/2009 |
| DE | 10 2009 019 702 A1 | 11/2009 |
| JP | 11-306490 A | 11/1999 |
| WO | WO 2007/048003 A2 | 4/2007 |

OTHER PUBLICATIONS

Form PCT/ISA/237 (six (6) pages).

German Office Action with English Translation dated Dec. 10, 2009 (nine (9) pages.

* cited by examiner

METHOD AND DEVICE FOR AUTOMATICALLY OPERATING A VEHICLE IN AN AUTONOMOUS DRIVING MODE REQUIRING NO USER ACTION

BACKGROUND AND SUMMARY OF THE INVENTION

Exemplary embodiments of the present invention relate to a method and a device for the automatic operation of a vehicle in an autonomous driving mode not requiring user action.

Methods for operating a motor vehicle with the support of an assistance system and such systems are known. This may involve closed-loop control for longitudinal and/or transverse dynamics of the motor vehicle, with supporting intervention for driving error and/or the inattention of the driver of the vehicle. Systems that set a distance from an object moving in front are known. Also known are assistance systems that intervene in the steering if the driver unintentionally leaves a lane or would leave a lane without the intervention of such systems.

German Patent document DE 10 2009 010 006 A1 discloses a method and a device for the partly autonomous or fully autonomous operation of a vehicle, wherein a driver assistance system takes over those driving functions of a driver of the vehicle of which it has been established that the driver wishes to hand them over to the driver assistance system. A driver intervention in a driving event during a partly or fully autonomous travel overrides a corresponding driver assistance function of the driver assistance system.

German Patent document DE 11 2006 002 892 T5 discloses a method and a device for switching between the autonomous and the manual operation of a vehicle, wherein a human interface facilitates processes of switching between autonomous and manual controls of a vehicle and enhances the operability and safety of vehicle use in the autonomous and manual operation of the vehicle.

Exemplary embodiments of the present invention provide a method and device for the automatic operation of a vehicle in an autonomous driving mode not requiring user action, wherein a user has a high degree of freedom with respect to his actions during the autonomous driving mode.

More specifically, a method for the automatic operation of a vehicle in an autonomous driving mode not requiring user action comprises a detection of a present traffic situation, a check whether the traffic situation fulfils a first criterion, and a blocking of a functionality that offers to a driver during the autonomous driving mode a secondary activity not related to driving the vehicle if the first criterion is fulfilled.

The term "autonomous driving mode" should be understood to describe the autonomous driving of a vehicle supported by assistance systems without any intervention by the user. Assistance systems take over the control of the longitudinal and transverse dynamics of the vehicle, for example, autonomous acceleration, braking and/or steering operations.

This offers the advantage that the user can be offered various options, which may include the reading of an electronic newspaper or the like. Although the user can engage in such secondary activities on offer in the autonomous driving mode and has a high degree of freedom with respect to such secondary activities, safety during a journey of the vehicle is ensured or even enhanced by the fact that, in the presence of a predetermined traffic situation, a functionality which offers the driver a secondary activity not related to driving the vehicle during the autonomous driving mode is blocked, so that the attention of the user is drawn to the driving operation itself.

The method preferably comprises a check whether the traffic situation fulfils a second criterion and a provision or signaling of a control opportunity for a driver of the vehicle for the activation of the autonomous driving mode if the traffic situation fulfils the second criterion.

This offers the advantage that the user can only initiate an autonomous driving mode in a traffic situation which is suitable for the autonomous driving mode.

The method preferably comprises a check of at least one warning criterion during the autonomous driving mode.

The method preferably comprises a warning to the driver if the at least one warning criterion is fulfilled.

In the method, the warning criterion preferably comprises several warning criteria, and the warning comprises a multi-stage warning to the driver on the basis of the several warning criteria.

The traffic situation in the method preferably is a traffic jam.

The users of vehicles find traffic jams time-consuming and inconvenient. In such a traffic situation felt to be inconvenient, the user can be freed of the need to control the vehicle by the autonomous driving mode.

In greater detail, a device for the automatic operation of a vehicle in an autonomous driving mode not requiring user action comprises detection devices for detecting a present traffic situation, a checking device for checking whether the traffic situation fulfils a first criterion, and a blocking device for the blocking of a functionality which offers to a driver during the autonomous driving mode a secondary activity not related to driving the vehicle if the first criterion is fulfilled.

This offers the advantage that the user can be offered various options, which may include the reading of an electronic newspaper or the like. Although the user can engage in such secondary activities on offer in the autonomous driving mode and has a high degree of freedom with respect to such secondary activities, safety during a journey of the vehicle is ensured or even enhanced by the fact that, in the presence of a predetermined traffic situation, a functionality that offers the driver a secondary activity not related to driving the vehicle during the autonomous driving mode is blocked, so that the attention of the user is drawn to the driving operation itself.

In the device, the checking device preferably checks whether the traffic situation fulfils a second criterion, and a device is provided for the provision or signaling of a control opportunity for a driver of the vehicle for the activation of the autonomous driving mode if the traffic situation fulfils the second criterion.

This offers the advantage that the user can only initiate an autonomous driving mode in a traffic situation which is suitable for the autonomous driving mode.

BRIEF DESCRIPTION OF THE DRAWING FIGURES

Further advantages, features and details can be derived from the following description in which—with reference to the drawing if applicable—at least one embodiment is described in detail. Described and/or illustrated features form, either individually or in any sensible combination, the subject matter of the invention—independent of the claims if applicable—and may additionally be the subject matter of one or more separate application(s). Identical, similar and/or functionally identical components are identified by the same reference numbers. Of the drawing:

DETAILED DESCRIPTION

Figure 1:
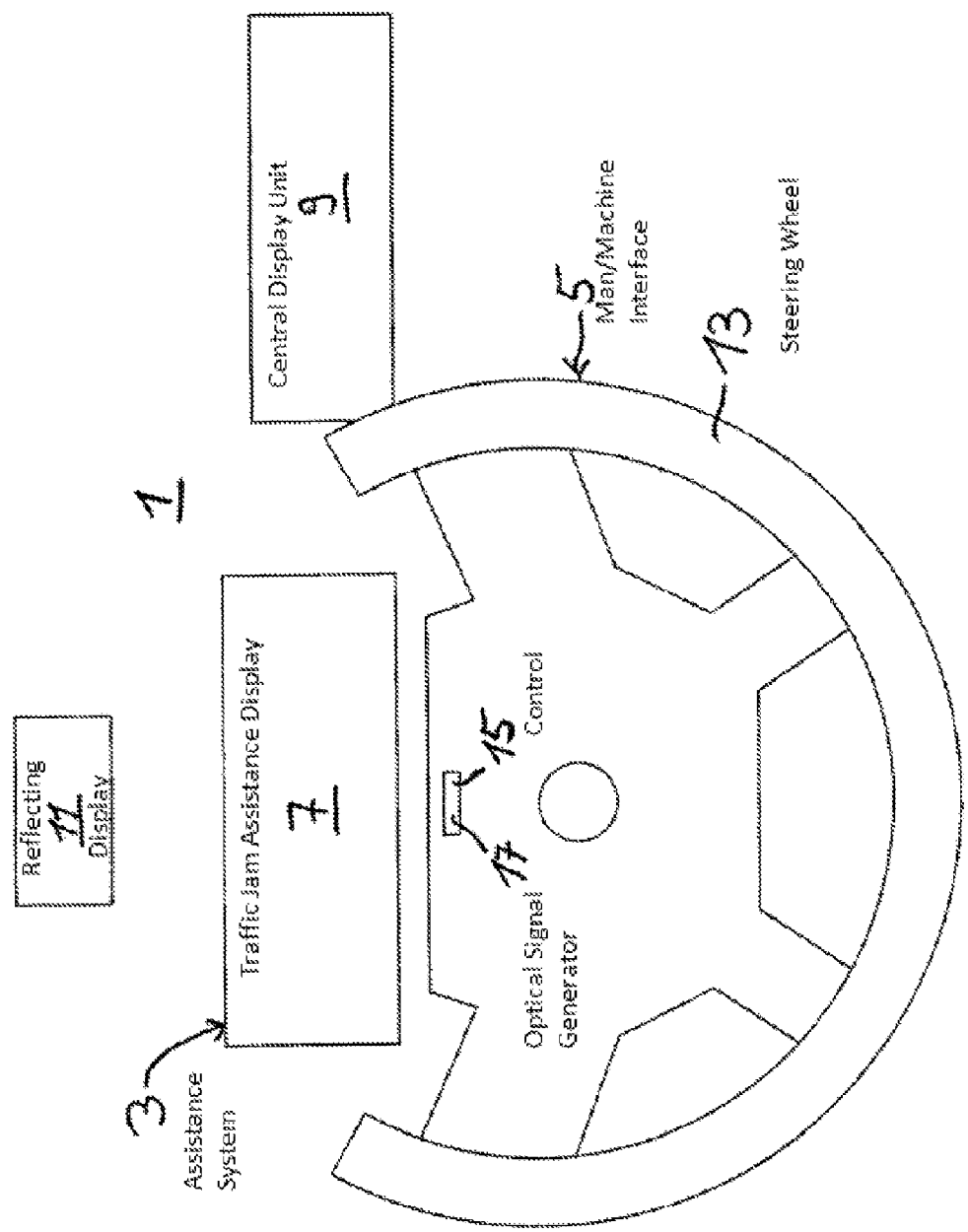
FIG. 1 is a diagrammatic representation of a man/machine interface of a vehicle with an assistance system.

FIG. 1 shows part of a vehicle 1 equipped with an assistance system 3, of which likewise only a part is shown. FIG. 1 is a diagrammatic representation of a man/machine interface 5, of which likewise only a part is shown, for driving the motor vehicle 1. Further controls, such as indicator lever, selector lever, pedal module and/or others, are not shown in FIG. 1. The assistance system 3 comprises a traffic jam assistance display 7, by means of which the functions of the assistance system 3 can be indicated and/or executed. The man/machine interface 5 further comprises a central display unit 9 and a reflecting display 11. The central display unit 9 may be designed, for example, as an LCD display. The traffic jam assistance display 7 may likewise be designed as an LCD display. If preferred, the traffic jam assistance display unit 7 and/or the central display unit 9 may be designed as touch-sensitive display units into which input commands can be entered by touch. The reflecting display unit 11 can be projected onto a windscreen in front of the man/machine interface 5.

The man/machine interface 5 has a steering wheel 13 for inputting steering commands. Alternatively, it would be possible to replace and/or supplement the steering wheel 13 by other inputting means, such as a joystick.

The steering wheel 13 has a control 15 in form of a push-button. The control 15 is provided with an optical signal generator 17, so that the control 15 can transmit an optical signal in at least one color to the driver of the vehicle 1.

Figure 2:
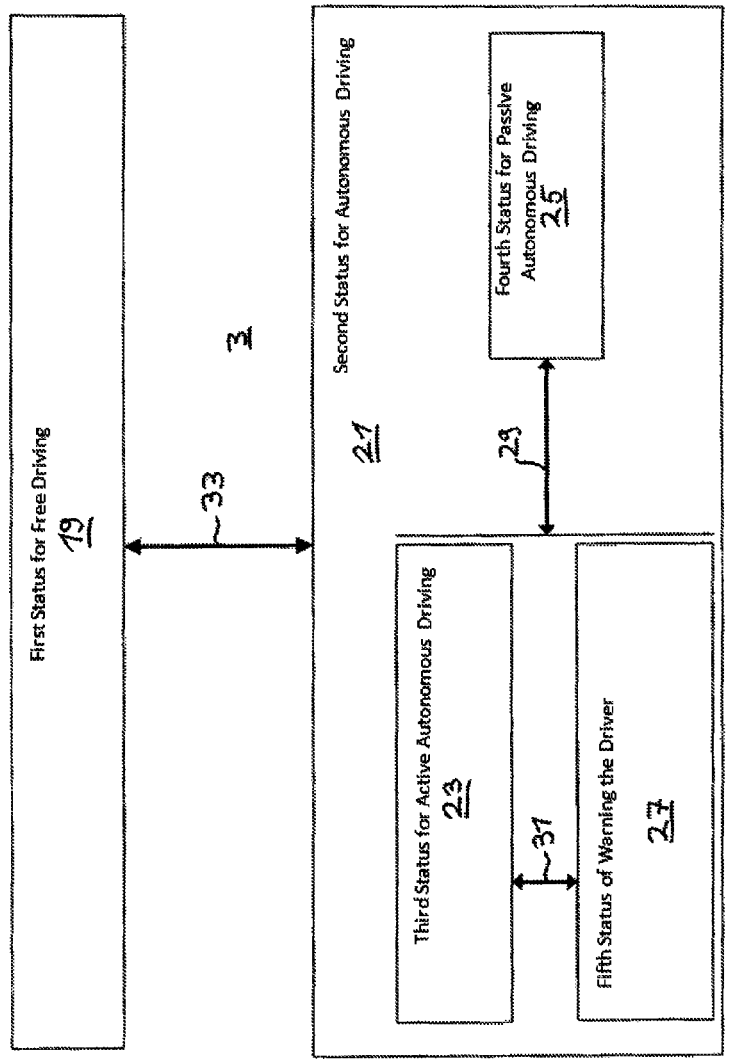
FIG. 2 is a diagram of a status logic between free driving and autonomous driving by means of the assistance system.

FIG. 2 shows a status logic of the motor vehicle 1 shown in FIG. 1 with the assistance system 3 and the man/machine interface 5. The status logic shown in FIG. 2 basically comprises a first status 19 for free driving and a second status for autonomous driving by means of the assistance system 3. In the first status 19, the driver of the motor vehicle 1 controls the man/machine interface 5, i.e., inputs substantially all driving commands himself or herself via the man/machine interface 5. In the second status 21 of autonomous driving, the assistance system 3 is active and takes over at least part of the control of the longitudinal and transverse dynamics of the motor vehicle 1, i.e. autonomously executes acceleration, braking and/or steering operations. The second status 21 of autonomous driving is split into a third status 23 of active autonomous driving, a fourth status 25 of passive autonomous driving and a fifth status 27 of warning the driver. In the fifth status 27 of warning the driver, the third status 23 may still prevail. Alternatively, it is conceivable that the assistance system 3 switches to the fourth status 25 of passive autonomous driving during the fifth status 27 of warning the driver.

During the fourth status 25 of passive autonomous driving, the assistance system 3 may remain entirely in the background. As a criterion for switching from the third status 23 and from the fifth status 27, if applicable, to the fourth status 25 and vice versa, a driver override 29 can be monitored. The term "driver override" 29 should be understood as the manual control of the man/machine interface 5 by the driver of the motor vehicle 1. If there is a driver override 29, there is a change-over to the fourth status 25. If there is no longer any driver override 29, for example if the driver of the motor vehicle 1 releases the steering wheel 13 of the man/machine interface 5, the system changes back to the third status 23.

During the fourth status 25, it is possible that the assistance system 3 supports the driver of the motor vehicle 1 by intervening only if dangerous situations occur as a result of the driver's input, for example if there is a risk that a lane is unintentionally left and/or that the motor vehicle 1 might hit an object moving in front. In this case, the driver override 29 may be ignored, and the assistance system 3 may correct the longitudinal and/or transverse dynamics of the motor vehicle 1 in order to avoid the dangerous situation. Alternatively, it is conceivable to design the assistance system 3 to be more passive and to give a higher priority to a driver override 29 even if a dangerous situation may have been detected, i.e., to let a collision happen for example, or just to reduce its impact.

During the third status 23, the driver of the motor vehicle 1 is fully supported by a completely autonomous control of the longitudinal and transverse dynamics of the motor vehicle 1. In this situation, it is advantageously possible for the driver of the motor vehicle 1 to turn his or her attention completely to other things than road traffic. For this purpose, the assistance system 3 may offer or enable secondary activities, for example by means of the traffic jam assistance display 7. Such secondary activities may for example include the reading of information, the searching of a worldwide data network, written and/or oral communication and/or similar activities.

For switching between the third status 23 and the fifth status 27 or for an additional activation of the fifth status 27, at least one warning criterion 31 can be checked. If the warning criterion 31 is fulfilled, it is possible to change from the third status 23 to the fifth status 27. The warning criterion 31 may be, for example, the resolution of a traffic jam, wherein a switch-off of the assistance system 3 is imminent, so that, by means of the fifth status 27, the attention of the driver can be returned to the traffic situation by suitable warnings. In addition, the secondary activities offered during the third status 23 can be blocked in the fifth status 27, so that the attention of the driver is returned to the traffic situation as fast as possible. The blocking action may be based on fulfilling a defined criterion related to a traffic situation, such as "traffic jam resolving", in order to redirect the driver's attention to what is happening in the traffic.

For changing between the first status 19 of free driving and the second status 21 of autonomous driving, a criterion 33 can be checked. This criterion 33 may be, for example, a detected traffic jam. If the criterion 33 is fulfilled, this fact can be signaled by means of the optical signal generator 16 of the control 15 shown in FIG. 1. In addition, the control 15 is enabled, so that the driver of the motor vehicle 1 can, by operating the control 15, switch from the first status 19 to the second status 21. The autonomous driving of the second status 21 advantageously follows a manual operation of the control 15, so that the driver of the motor vehicle 1 cannot be surprised by a sudden takeover of the assistance system 3. On the contrary, the driver will always retain control over if and when the system should switch from the first status 19 to the second status 21. The criterion 33 merely ensures that this can only happen if the assistance system 3 also detects a traffic situation that is suitable for active or passive autonomous driving, in particular a traffic jam.

Figure 3:
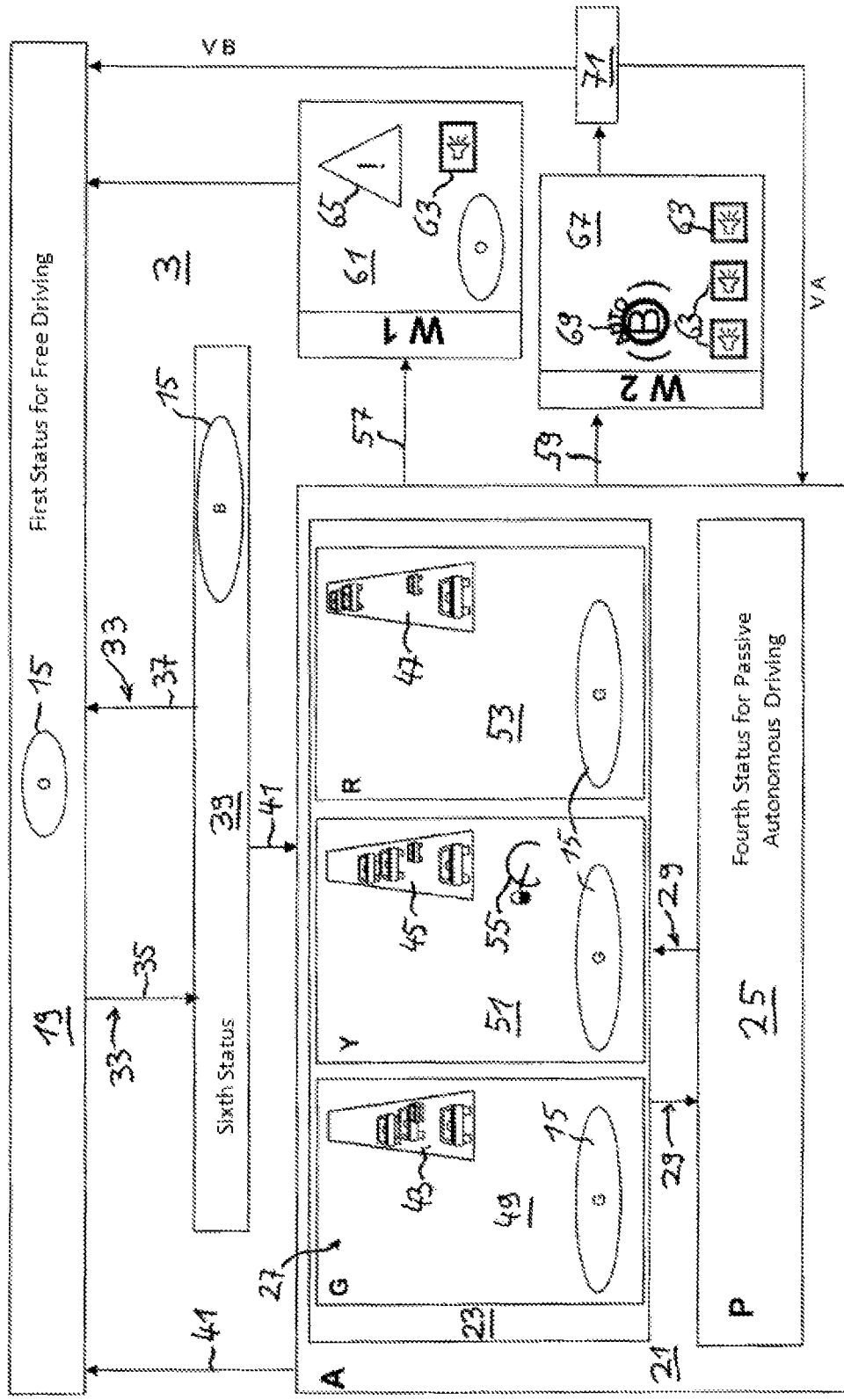
FIG. 3 is a further diagrammatic representation of a status logic, with various warning stages provided for returning the attention of the driver to the traffic events.

FIG. 3 is a detailed view of a status logic of the assistance system 3 of the motor vehicle 1 and/or of the man/machine interface 5 of the motor vehicle 1. By means of oval shapes, a status of the optical signal generator 17 of the control 15 is indicated at various points. The optical signal generator 17 can adopt at least three statuses, G symbolizing a green light, B a blue light and O a light in another color or no illumination. O represents the first status 19. B represents the first status 19 but signals that it is possible to switch to the second status 21 of autonomous driving by operating the control 15, which is additionally indicated in FIG. 3 by the letter A for "Angeschaltet" (started).

The criterion 33 is divided into an availability criterion 35 and a non-availability criterion 37. If the availability criterion 35 of the criterion 33 is fulfilled, the assistance system 3 switches to a sixth status 39, in which the optical signal generator 17 of the control 15 is illuminated blue and the assistance system 3 is available and is signaled to be available for manual control by the driver of the motor vehicle 1. If the assistance system is in the sixth status 39, the operation of the control 15 results in the second status 21 of autonomous driving. A further operation 41 of the control 15 accordingly returns the system to the first status 19 of free driving. As soon as the second status 21 of autonomous driving has been initiated by means of the operation 41 by the driver of the motor vehicle 1, the assistance system 3 switches to the third status 23 of active autonomous driving. In the third status 23 of active autonomous driving, a first information warning criterion 43, a second information warning criterion 45 and a third information warning criterion 47 are checked cyclically. In accordance with a presence of the information warning criteria 43 to 47, the assistance system changes in the third status 23 to a seventh status 49 at a first information warning, to an eighth status 51 at a second information warning and to a ninth status 53 at a third information warning. In the third status 23 or the sub-statuses 49 to 53 respectively, the control 15 or the optical signal generator 17 of the control 15 is illuminated green to indicate the activity of the assistance system 3.

The first information warning criterion 43 is fulfilled if a travelling speed of the motor vehicle 1 is 39 km/h and a distance from an object travelling ahead is 30 m. Accordingly, an information warning can be output to the driver if the first information warning criterion 43 is fulfilled, i.e., in the seventh status 49. This information warning may be represented, for example, by a window opening on the traffic jam display 7. A suitable text of the window may read "Traffic jam assistant on! Automatic steering, braking, acceleration activated". At the same time, the optical signal generator 17 of the control 15 is illuminated green.

The sixth status 39, in which the optical signal generator 17 of the control 15 is illuminated blue, may also be accompanied by a window opening on the traffic jam assistance display 7. The text of the window reads "Traffic jam assistant available", accompanied by a graphic representation of the control 15 in combination with the text "Activates system".

The second information warning criterion 45 is fulfilled if the speed of the motor vehicle is 40 km/h or the distance from an object travelling ahead is more than 30 m and 45 m. The travelling speed of 40 km/h cannot be exceeded, because in the third status a speed limiter 55 of the assistance system 3, which is set to 40 km/h, is activated. If the objects travelling ahead demand a higher speed, the speed limiter 55 becomes active and limits the travelling speed to 40 km/h, the second information warning criterion 45 being fulfilled at the same time. In the eighth status 51, the optical signal generator 17 of the control 15 is illuminated green, thereby indicating the activity of the assistance system 3. A corresponding warning can be given by means of a window of the traffic jam assistance display 7 opening. The text of the window reads "Changed traffic jam conditions. Traffic jam assistant remains active".

The third information warning criterion 47 is fulfilled if the distance of the motor vehicle from the object travelling ahead is more than 40 m and 50 m or if a number of objects travelling ahead or of vehicles caught in the traffic jam is less than three. This ninth status 53 can likewise be indicated by means of a window of the traffic jam assistance display 7 opening. The text of the window reads "Traffic jam assistant could switch off. Observe traffic".

FIG. 3 indicates the statuses 49 to 53 additionally by the letters G for green, Y for yellow and R for red. In accordance with this, the opening windows of the associated warning messages in the traffic jam display unit 7 can appear in the colors green, yellow and red.

To change between the fourth status 25 and the third status 23, it is checked whether or not there is a driver override 29, which is indicated in FIG. 3 by means of arrows pointing in two different directions; a change from the third status 23 to the fourth status 25 occurs if there is a driver override 29, with a change-back if there is no longer a driver override 29. In the second status 21 of autonomous driving, a first warning criterion 57 and a second warning criterion 59 are checked cyclically. The first warning criterion 57 is fulfilled if the distance from the object travelling ahead is greater than a maximum distance, or if the object travelling ahead can no longer be detected reliably, or if a detection of the lane in which the vehicle travels is no longer classified as reliable. If the first warning criterion 57 is fulfilled, the assistance system 3 switches to a status 61 of a first warning symbolized by W1 in FIG. 3. In the tenth status 61, the assistance system 3 is switched off, which is signaled by means of the optical signal generator 17 of the control 15 and indicated in FIG. 3 by the letter O. In this process, an acoustic signal 63, for example a single beep, is output by an acoustic signal generator of the assistance system 3. At the same time, there is a first optical warning 65 in the form of a triangle with an exclamation mark. The first optical warning 65 appears on the traffic jam assistance display unit 7. In addition, the first optical warning 65 may appear on the reflecting display 11 and/or on the central display unit 9. From the tenth status 61, the assistance system 3 switches to the first status 19 of free driving. For this purpose, the driver has to take account of the first optical warning 65 and once again operate the man/machine interface 5. If the second warning criterion 59 is fulfilled, the assistance system 3 switches to an eleventh status 67 of automatic braking to a standstill. The second warning criterion 59 may be fulfilled, for example, if the driver of the motor vehicle 1 ignores the tenth status 61 of the first warning. During the automatic braking to a standstill in the eleventh status 67, a second optical warning 69 is issued in the form of a symbolized brake drum and the letters Auto, a B for braking on the traffic jam display unit 7 and on the reflecting display 11 and possibly on the central display unit 9 as well. In addition, the acoustic signal 63 is repeated, at a higher volume if required. After the automatic braking to a standstill in the eleventh status 67, the assistance system 3 is in a twelfth status 71, in which the motor vehicle 1 is stationary, i.e., has a travelling speed of 0 km/h. According to a first variant of the assistance system 3, it reverts from the twelfth status 71 to the second status 21 of the autonomous driving of the motor vehicle 1, which is indicated in FIG. 3 by the letters VA. According to a second alternative indicated in FIG. 3 by the letters VB, the assistance system 3 reverts from the twelfth status 71 to the first status 19 of free driving, in which the driver of the motor vehicle 1 is once again responsible for driving the motor vehicle 1.

In the fourth status 25 of passive autonomous driving, which is indicated by the letter P in FIG. 3, an opening window can likewise appear in the traffic jam display unit 7. The text reads "Passive through", and there is a symbol of the control 15 with the text "System shutdown possible". In the first status 19 of free driving, the traffic jam assistance display 7 can be switched off, i.e., the display may be black.

Figure 4:
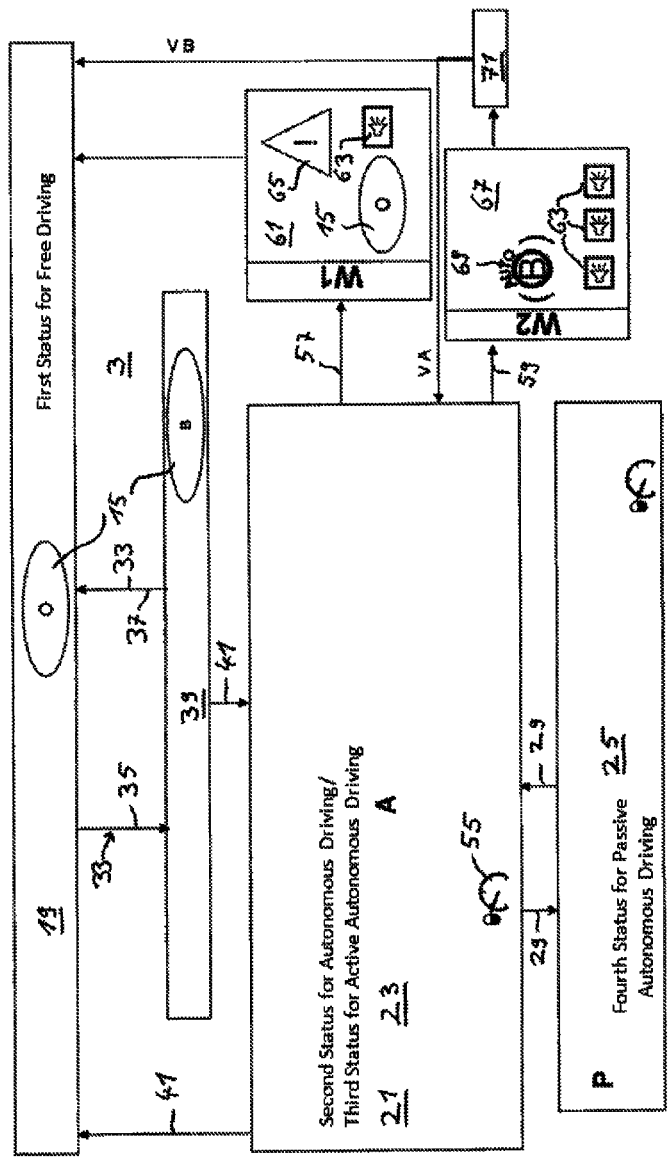
FIG. 4 shows a further status logic without any warning stages.

FIG. 4 shows a further status logic of an assistance system 3 in analogy to the status logic shown in FIG. 3.

In contrast to the illustration of FIG. 3, only the driver override 29 is checked. In addition, the speed limiter 55 is active in the third status 23 and in the fourth status 25, for example at 40 km/h.

The availability criterion 35 is fulfilled if the travelling speed of the motor vehicle 1 is 30 km/h and the distance from the object travelling ahead is 30 m, if there is object detection and if lane detection is plausible. The non-availability criterion 37 is fulfilled if the travelling speed is higher than 30 km/h or the distance greater than 30 m, or if there is no object detection or lane detection is not plausible.

Figure 5:
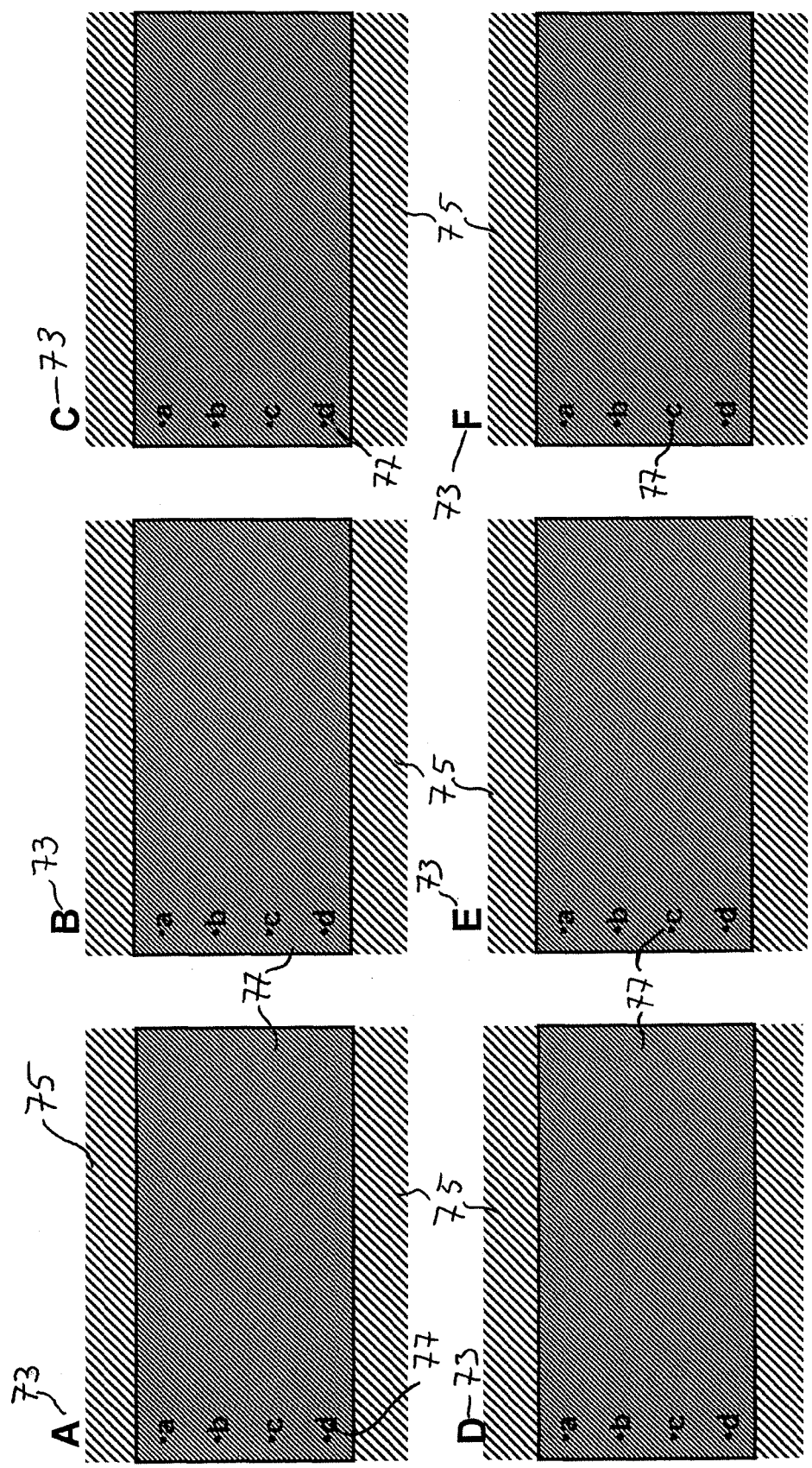
FIG. 5 is a diagrammatic representation of a display of the man/machine interface shown in FIG. 1 for offering secondary activities during an active autonomous driving of the vehicle by means of the assistance system.

FIG. 5 is a diagrammatic representation of the traffic jam assistance display unit 7 of the man/machine interface 5 of the assistance system 3 shown in FIG. 1 in a traffic jam, i.e., while the assistance system 3 is active. The view of the traffic jam assistance display unit 7 as shown in FIG. 5 can appear to the driver in a traffic jam in order to offer secondary activities. By means of the capital letters A, B, C, D, E, F, six different types of secondary activities can be offered, each letter A-F symbolizing a heading range. The headings may for example be Paperwork, Shopping, Overview of Traffic Conditions, Information and Entertainment, Health and Wellbeing and Entertainment. Under each of the headings 73, there are image areas 75 that may offer images corresponding to the headings 73 A-F. Superimposed on the image areas 75, there are sub-headings 77 or corresponding rectangular areas of the sub-headings 77, each identified by the lower-case letters a, b, c, d. The areas of the sub-headings 77, which are identified by fine hatching in FIG. 5, may be semi-transparent, and the images of the image areas 75, which are identified by coarse hatching, may show through in a semi-transparent manner. The sub-headings may for example be View Documents, Voicemail, View Stock Exchange, Email or Electronic Shops or Road Maps, Traffic Report, Bird's Eye View or Coffee Maker, Newspaper, Audio Books, News of Vehicle Manufacturer or Daydreams, Mental or Physical Exercises, Condition of Body, Health Training or Films, TV, Pictures, Games. The driver of the motor vehicle 1 can advantageously select on the traffic jam assistance display unit 7 as shown in FIG. 5 from the headings 73 or the corresponding sub-headings 77 a topic of interest. This can be done by means of any navigational device, for example by touching the traffic jam assistance display unit, an input wheel, an input wheel with force feedback, a force-sensitive pin, a joystick and/or voice input.

The tenth status 61 of the first warning and the eleventh status 67 of autonomous braking are cancelled as soon as the driver reacts, for example by an input at the man/machine interface 5.

When switching to the second status 21 of autonomous driving, in particular active autonomous driving, a design of the man/machine interface 5 may conceivably be changed, for example by switching on an illumination, by making a coffee maker accessible or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method comprising:
   operating a vehicle in an autonomous driving mode;
   detecting, by a sensor, a present traffic situation while operating the vehicle in the autonomous driving mode, the present traffic situation being a distance between the vehicle and another vehicle;
   providing, on a screen in the vehicle, a driver of the vehicle with a secondary activity not related to driving the vehicle while in the autonomous driving mode;
   checking whether the present traffic situation fulfils a first criterion while in the autonomous driving mode; and
   blocking the driver from accessing the secondary activity not related to driving the vehicle while in the autonomous driving mode if the first criterion is fulfilled, wherein the first criterion is fulfilled when the distance between the vehicle and the another vehicle increases above a predetermined distance.

2. The method according to claim 1, further comprising:
   checking at least one warning criterion during the autonomous driving mode.

3. The method according to claim 2, further comprising:
   warning the driver if the at least one warning criterion is fulfilled.

4. The method according to claim 3, wherein the warning criterion comprises several warning criteria, and the warning comprises a multi-stage warning to the driver on the basis of the several warning criteria.

5. The method according to claim 1, wherein the present traffic situation is a traffic jam.

6. The method according to claim 1, wherein the predetermined distance is between 40 and 50 meters.

7. A method comprising:
   detecting, by a sensor, a present traffic situation while operating the vehicle in the autonomous driving mode, the present traffic situation being a distance between the vehicle and another vehicle;
   checking whether the present traffic situation fulfils a second criterion; and
   providing or signalling a control opportunity for the driver of the vehicle for activation of the autonomous driving mode if the present traffic situation fulfils the second criterion;
   operating a vehicle in an autonomous driving mode;
   providing, on a screen in the vehicle, a driver of the vehicle with a secondary activity not related to driving the vehicle while in the autonomous driving mode;
   checking whether the present traffic situation fulfils a first criterion while in the autonomous driving mode; and
   blocking the driver from accessing the secondary activity not related to driving the vehicle while in the autonomous driving mode if the first criterion is fulfilled, wherein the first criterion is fulfilled when the distance between the vehicle and the another vehicle increases above a predetermined distance.

8. The method according to claim 7, wherein the predetermined distance is between 40 and 50 meters.

9. A method comprising:
   monitoring, by a sensor, present traffic conditions of the vehicle;
   activating an autonomous driving mode of a vehicle when the present traffic conditions are a traffic jam;

providing, on a screen in the vehicle, a driver of the vehicle with a secondary activity not related to driving the vehicle when the vehicle is operated in the autonomous driving mode and the present traffic conditions are the traffic jam;

blocking the driver from accessing the secondary activity not related to driving the vehicle while in the autonomous driving mode when the present traffic conditions indicate that the traffic jam is resolving.

10. The method according to claim 9, wherein the present traffic conditions are a traffic jam when a traveling speed of the vehicle is less than or equal to 39 km/h and a distance between the vehicle and another vehicle is less than or equal to 30 m.

11. The method according to claim 9, wherein the present traffic conditions indicate that the traffic jam is resolving when a distance between the vehicle and another vehicle is less greater than a predetermined distance, wherein the predetermined distance is between 40 and 50 meters.

12. The method according to claim 9, wherein when the traffic conditions indicate that the traffic jam is resolving a warning is provided to the driver.

13. The method according to claim 12, wherein the warning comprises a multi-stage warning to the driver on the basis of several warning criteria.

* * * * *